United States Patent
Fujiwara

(10) Patent No.: US 9,399,440 B2
(45) Date of Patent: Jul. 26, 2016

(54) VEHICLE SIDE AIRBAG DEVICE AND SIDE AIR BAG MANUFACTURING METHOD

(71) Applicant: TOYOTA JIDOSHA KABUSHIKI KAISHA, Toyota-shi, Aichi-ken (JP)

(72) Inventor: Yusuke Fujiwara, Okazaki (JP)

(73) Assignee: TOYOTA TECHNICAL DEVELOPMENT CORPORATION, Toyota (JP)

( * ) Notice: Subject to any disclaimer, the term of this patent is extended or adjusted under 35 U.S.C. 154(b) by 0 days.

(21) Appl. No.: 14/426,043

(22) PCT Filed: Aug. 30, 2013

(86) PCT No.: PCT/JP2013/073366
§ 371 (c)(1),
(2) Date: Mar. 4, 2015

(87) PCT Pub. No.: WO2014/038486
PCT Pub. Date: Mar. 13, 2014

(65) Prior Publication Data
US 2015/0246656 A1    Sep. 3, 2015

(30) Foreign Application Priority Data

Sep. 4, 2012   (JP) ................................ 2012-194303

(51) Int. Cl.
| | | |
|---|---|---|
| *B60R 21/231* | (2011.01) | |
| *B60R 21/2334* | (2011.01) | |
| *B60R 21/2346* | (2011.01) | |
| *B60R 21/235* | (2006.01) | |
| *B60R 21/233* | (2006.01) | |
| *B60R 21/2338* | (2011.01) | |

(52) U.S. Cl.
CPC .......... *B60R 21/23138* (2013.01); *B60R 21/235* (2013.01); *B60R 21/2346* (2013.01); *B60R 21/233* (2013.01); *B60R 21/2338* (2013.01); *B60R 2021/23146* (2013.01); *B60R 2021/23324* (2013.01); *B60R 2021/23382* (2013.01); *B60R 2021/23533* (2013.01); *Y10T 29/49826* (2015.01)

(58) Field of Classification Search
CPC ............... B60R 21/23138; B60R 2021/23146; B60R 2021/23382; B60R 2021/23533; B60R 2021/23316; B60R 2021/261; B60R 2021/2615; B60R 2021/2612
See application file for complete search history.

(56) References Cited

U.S. PATENT DOCUMENTS 5,536,038 A * 7/1996 Bollaert .................. B60R 21/23
280/730.2
5,586,782 A * 12/1996 Zimmerman, II . B60R 21/23138
280/730.2

(Continued)

FOREIGN PATENT DOCUMENTS

| EP | 2876002 A1 | 5/2015 |
|---|---|---|
| JP | 2010132072 A | 6/2010 |

(Continued)

*Primary Examiner* — James English
(74) *Attorney, Agent, or Firm* — Oliff PLC

(57) ABSTRACT

In a side air bag of a vehicle side air bag device, a front bag portion and a rear bag portion are partitioned by a tether portion. A plurality of gas feed openings is formed in the tether portion. Further, a forward extending portion is extended from an upper end of the rear bag portion toward an upper end side of the front bag portion. The forward extending portion and the front bag portion are partitioned by a seam portion.

8 Claims, 5 Drawing Sheets

(56) References Cited

U.S. PATENT DOCUMENTS

| | | | | |
|---|---|---|---|---|
| 6,270,113 B1 * | 8/2001 | Wipasuramonton | B60R 21/23138 | 280/728.1 |
| 2012/0248746 A1 * | 10/2012 | Yamamoto | B60R 21/23138 | 280/729 |
| 2014/0035264 A1 * | 2/2014 | Fukushima | B60R 21/23138 | 280/730.2 |
| 2014/0159355 A1 * | 6/2014 | Fujiwara | B60R 21/23138 | 280/730.2 |
| 2014/0239618 A1 * | 8/2014 | Katsumata | B60R 21/23138 | 280/728.3 |
| 2015/0076803 A1 * | 3/2015 | Fujiwara | B60R 21/207 | 280/730.2 |
| 2015/0137493 A1 * | 5/2015 | Fujiwara | B60R 21/233 | 280/729 |
| 2015/0197212 A1 * | 7/2015 | Fujiwara | B60R 21/233 | 280/729 |

FOREIGN PATENT DOCUMENTS

| | | | |
|---|---|---|---|
| JP | WO 2011077510 A1 * | 6/2011 | ........ B60R 21/23138 |
| JP | 2011240807 A | 12/2011 | |
| JP | 5423903 B1 | 2/2014 | |
| WO | 2013183130 A1 | 12/2013 | |
| WO | 2014013822 A1 | 1/2014 | |

* cited by examiner

VEHICLE SIDE AIRBAG DEVICE AND SIDE AIR BAG MANUFACTURING METHOD

TECHNICAL FIELD

The present invention relates to a vehicle side air bag device and a side air bag manufacturing method.

BACKGROUND ART

In a vehicle side air bag device described in Patent Document 1, a side air bag includes: a rear-side tube bag portion configured to extend in an up-down direction on a vehicle rear side relative to an outer end, in a vehicle width direction, of a chest of a sitting occupant at the time when the side air bag is expanded and unfolded; and a front-side tube bag portion placed on a vehicle front side relative to the rear-side tube bag portion and on the vehicle rear side relative to the outer end, in the vehicle width direction, of the chest of the sitting occupant and configured to extend in the up-down direction. An upper part of the rear-side tube bag portion is placed on a lateral side of a shoulder of the sitting occupant so as to serve as a shoulder restraining portion that restrains the shoulder, and an upper edge of the front-side tube bag is placed at a position lower than a side of the sitting occupant on the vehicle front side relative to the shoulder restraining portion, and serves as an arm support portion on which an upper arm of the sitting occupant is placed.

That is, in the vehicle side air bag device, that shoulder of the sitting occupant which has a relatively high resistance is restrained by the shoulder restraining portion, while the upper arm of the sitting occupant is placed on the arm support portion, so as to prevent the upper arm from being placed between an air bag and that chest of the sitting occupant which has a relatively low resistance.

CITATION LIST

Patent Documents

Patent Document 1: Japanese Patent Application Publication No. 2010-132072 (JP 2010-132072 A)

SUMMARY OF THE INVENTION

Problem to be Solved by the Invention

However, the vehicle side air bag device has such a possibility that, when a vehicle has a side collision from a diagonally front side, an upper body of the sitting occupant moves toward the vehicle front side and the shoulder may come off from the rear-side tube bag portion. In order to deal with such a problem, it is conceivable that the upper part of the rear-side tube bag portion is extended toward the vehicle front side across a center of the shoulder. However, in a case where the upper part of the rear-side tube bag portion is just extended toward the vehicle front side across the center of the shoulder, it is difficult to take a long energy absorption stroke at the time of the side collision, because the above conventional technique employs such a structure that the rear-side tube bag portion and the front-side tube bag portion are partitioned from each other in the front-rear direction by a seam. Further, in order to deal with this problem, it is conceivable that the rear-side tube bag portion and the front-side tube bag portion are partitioned from each other by use of a tether. However, in this case, the tether is placed in a boundary portion between the front-side tube bag portion and a forward extended portion. Accordingly, that part is thickened, so that upper-arm pushup performance decreases.

The present invention has been accomplished in consideration of the above fact, and is intended to obtain a vehicle side air bag device and a side air bag manufacturing method each of which is able to quickly restrain a shoulder of a sitting occupant at the time of a side collision from a diagonally front side and to prevent an upper arm from being placed between a side air bag and a chest of the sitting occupant and which is able to successfully maintain energy absorption performance o at the time of the side collision.

Means for Solving the Problem

A vehicle side air bag device according to a first aspect of the present invention includes: an inflator provided in a vehicle seat and configured to be activated to generate gas when a side collision of a vehicle is detected or predicted; a side air bag provided in a side portion on an outer side, in a vehicle width direction, of a seatback of the vehicle seat, the side air bag being configured to be expanded and unfolded between a sitting occupant and a vehicle-body side portion when the gas generated from the inflator is supplied therein-side, the side air bag including a front bag portion configured to restrain front parts of a chest and an abdomen of the sitting occupant, a rear bag portion including the inflator thereinside and configured to restrain rear parts of the chest and the abdominal, and a forward extending portion extended toward a vehicle front side from an upper end of the rear bag portion so as to be placed on a vehicle upper side of the front bag portion, the forward extending portion being configured to restrain a shoulder of the sitting occupant; a tether portion placed in a boundary portion between the front bag portion and the rear bag portion in the side air bag so as to partition the front bag portion from the rear bag portion, the tether portion having a gas feed opening via which the front bag portion and the rear bag portion communicate with each other; and a seam portion or a narrow-width tether portion narrower than the tether, the seam portion or the narrow-width tether portion being set in a boundary portion between the forward extending portion and the front bag portion in the side air bag so as to partition the forward extending portion from the front bag portion.

A vehicle side air bag device according to a second aspect is configured such that: in the first aspect, the side air bag is configured to include: a main panel made of one or two panels and forming the rear bag portion, the forward extending portion, and the tether portion; and paired right and left subpanels sewed to the main panel with tether margins to form the tether portion, the paired right and left subpanels forming the front bag portion.

A vehicle side air bag device according to a third aspect is configured such that: in the first or second aspect, a rectification cloth is disposed inside the rear bag portion, the rectification cloth including a first rectification portion, a second rectification portion, and a third rectification portion configured to flow the gas ejected from the inflator to three directions of a vehicle upper side, a vehicle lower side, and a vehicle front side; and the third rectification portion is inserted into the gas feed opening of the tether portion.

A side air bag manufacturing method according to a fourth aspect includes: a panel connection step of sewing secondary longitudinal edge portions of paired right and left subpanels to a main panel at a position offset from main longitudinal edge portions of the main panel toward a center line of the main panel, the main panel including a rear bag portion forming portion to form a rear bag portion configured to restrain rear parts of a chest and an abdomen of a sitting occupant, and forward extending portion forming portions to form a forward extending portion configured to restrain a shoulder of the sitting occupant, the forward extending portion forming portions being extended from an end, in a longitudinal direction, of the rear bag portion forming portion in directions intersecting with the rear bag portion forming portion, the main panel having a symmetrical shape in a right-and left direction, the main panel including the paired right and left main longitudinal edge portions on both side edges of the rear bag portion forming portion, and paired right and left main lateral edge portions on respective lower edges of the forward extending portion forming portions, the paired right and left subpanels each having the secondary longitudinal edge portion on one side edge and a secondary lateral edge portion on an upper edge intersecting with the one side edge, the paired right and left subpanels being configured to form a front bag portion configured to restrain front parts of the chest and the abdomen of the sitting occupant; a tether portion forming step of forming a tether portion having a gas feed opening, by sewing the main longitudinal edge portions of the main panel to each other; a seam portion forming step of sewing the paired main lateral edge portions of the main panel and the paired secondary lateral edge portions of the paired right and left subpanels in an overlapping manner; and an outer periphery sewing step of sewing outer peripheral portions of the main panel and outer peripheral portions of the subpanels.

A side air bag manufacturing method according to a fifth aspect is configured such that: in the fourth aspect, a rectification cloth is placed on a rear-bag-portion-forming-portion side of the main panel, and includes a first rectification portion and a second rectification portion configured to flow gas toward both ends, in a longitudinal direction, of the rear bag portion forming portion, and a third rectification portion extended in a direction intersecting with the first rectification portion and the second rectification portion and configured to flow the gas in its extending direction, and in the tether portion forming step, a tip end of the third rectification portion is inserted into the gas feed opening so that the tip end is sewed together with the main longitudinal edge portions of the main panel.

A side air bag manufacturing method according to a sixth aspect is configured such that: in the fourth aspect, semicircular notch portions are formed in the paired right and left main longitudinal edge portions, and when the paired right and left main longitudinal edge portions are sewed to each other in the tether portion forming step, a round-shaped gas feed opening is formed.

A side air bag manufacturing method according to a seventh aspect is configured such that: in the fifth aspect, the rectification cloth is formed in advance separately from the side air bag by sewing outer peripheral portions of two base cloths cut in a T-shape, and in the tether portion forming step, the tip end of the third rectification portion is inserted into the gas feed opening so that the tip end is sewed together with the main longitudinal edge portions of the main panel.

A side air bag manufacturing method according to an eighth aspect is configured such that: in the fifth or seventh aspect, in the tether portion forming step, at the time when the main longitudinal edge portions of the main panel are sewed to each other, a lower side sewing line below the third rectification portion and an upper side sewing line above the third rectification portion are sewed separately, and an upper end of the lower side sewing line is extended toward the tip end of the third rectification portion, and a lower end of the upper side sewing line is extended toward the tip end of the third rectification portion.

According to the first aspect, when a side collision of a vehicle is detected or predicted, the inflator generates gas. Since the inflator is placed inside the rear bag portion of the side air bag, the rear bag portion is expanded and unfolded first. Hereby, the rear parts of the chest and the abdomen of the sitting occupant are restrained. Further, the forward extending portion is extended toward the vehicle front side from the upper end of the rear bag portion so as to be placed on the vehicle upper side of the front bag portion. Accordingly, the gas generated from the inflator is supplied to the forward extending portion. Hereby, the shoulder of the sitting occupant is restrained. Further, the rear bag portion and the front bag portion communicate with each other via the gas feed opening of the tether that partitions them, so that the gas supplied to the rear bag portion is partially supplied into the front bag portion through the gas feed opening. Hereby, the front bag portion is expanded and unfolded following the rear bag portion, so that the front parts of the chest and the abdomen of the sitting occupant are restrained.

Here, in the present aspect, the forward extending portion is extended toward the vehicle front side from the upper end of the rear bag portion so as to be placed on the vehicle upper side of the front bag portion. Accordingly, even in a case of a side collision from a diagonally front side, the shoulder is restrained quickly. Further, in the present invention, since the rear bag portion and the front bag portion are partitioned by the tether, it is possible to secure an energy absorption stroke at the time of a side collision, in comparison with a configuration in which they are sectioned by a seam portion. Further, in the present embodiment, since the forward extending portion and the front bag portion are partitioned by the seam portion of the narrow-width tether portion, an upper arm of the sitting occupant is pushed up toward the vehicle upper side in response to an expanding and unfolding operation of the side air bag.

According to the second aspect, the side air bag is configured to include the main panel made of one or more panels, and the paired right and left subpanels. Further, the subpanels are sewed to the main panel(s) with the tether margins. This makes it possible to easily form the structure in comparison with a structure in which the tether is cut in advance separately from the side air bag, and then sewed to the main panel.

According to the third aspect, the rectification cloth is disposed in the rear bag portion. Accordingly, the gas generated from the inflator flows from the first rectification portion toward the vehicle upper side, flows from the second rectification portion toward the vehicle lower side, and further flows from the third rectification portion toward the vehicle front side. Since the third rectification portion is inserted into the gas feed opening of the tether portion, the gas passing through the third rectification portion flows into the front bag portion. Since the rectification cloth includes the first rectification portion, the second rectification portion, and the third rectification portion as such, the front bag portion can be expanded and unfolded at an early stage.

According to the fourth embodiment, the side air bag is manufactured in the following manner. First, in the panel connection step, the paired right and left subpanels are connected to the main panel. More specifically, the secondary longitudinal edge portions of the subpanels are sewed at a position that is offset from the main longitudinal edge portions of the rear bag portion forming portions of the main panel toward the center line of the main panel. Then, in the tether portion forming step, the tether portion having a gas feed opening is formed by sewing the main longitudinal edge portions of the main panel to each other. Subsequently, in the seam portion forming step, the paired main lateral edge portions of the main panel and the paired secondary lateral edge portions of the paired right and left subpanels are sewed in an overlapping manner. Finally, in the outer periphery sewing step, the outer peripheral portions of the main panel and the outer peripheral portions of the subpanels are sewed. Hereby, the rear bag portion is formed by the rear bag portion forming portion and the tether portion, the forward extending portion is formed by the forward extending portion forming portions, and further, the front bag portion is formed by the tether portion and the paired right and left subpanels.

According to the fifth aspect, the rectification cloth including the first rectification portion, the second rectification portion, and the third rectification portion is provided, and in the tether portion forming step, the tip end of the third rectification portion of the rectification cloth is inserted into the gas feed opening of the tether portion. Then, the tip end is sewed together with the main longitudinal edge portions of the main panel.

Advantageous Effects of Invention

As described above, the vehicle side air bag device according to the first aspect has such an excellent effect that, even in a case of a side collision from the diagonally front side, it is possible to quickly restrain the shoulder of the sitting occupant and to prevent the upper arm from being placed between the chest of the sitting occupant and the side air bag, and further it is possible to successfully maintain energy absorption performance at the time of the side collision.

The vehicle side air bag device according to the second aspect has such an excellent effect that the side air bag achieving the above object can be obtained with a simple configuration.

The vehicle side air bag device according to the third aspect has such an excellent effect that the front bag portion can be expanded and unfolded at an early stage, thereby making it possible to increase an upper-arm pushup effect.

The side air bag manufacturing method according to the fourth aspect has such an excellent effect that the side air bag can be easily manufactured.

The side air bag manufacturing method according to the fifth aspect has such an excellent effect that it is possible to easily manufacture the side air bag including the rectification cloth provided with the first rectification portion, the second rectification portion, and the third rectification portion.

MODES FOR CARRYING OUT THE INVENTION

<First Embodiment>

Figure 1:
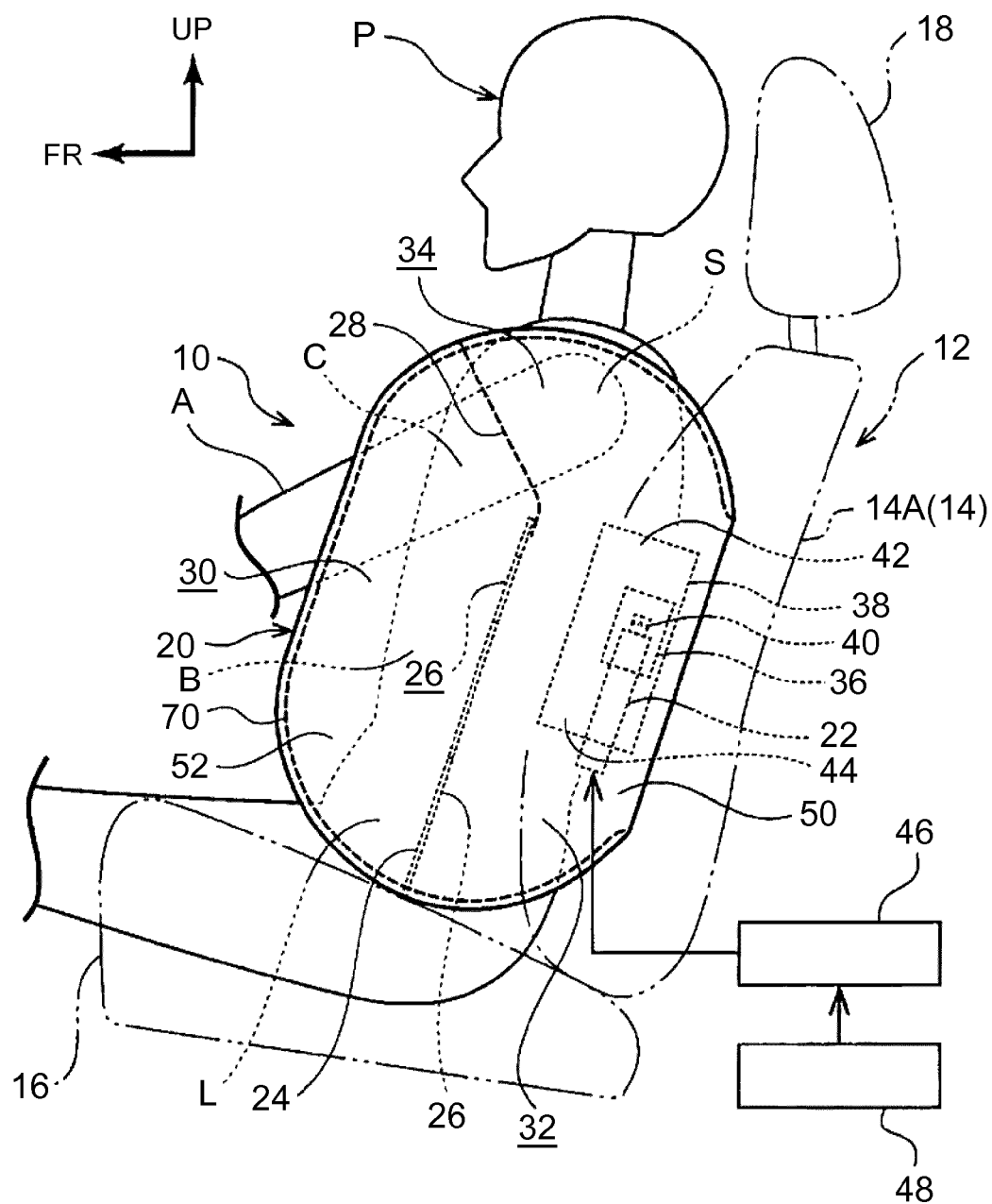
FIG. 1 is a side view illustrating an expanded unfolded state of a side air bag in a vehicle seat provided with a vehicle side air bag device according to a first embodiment of the present invention.
Figure 2:
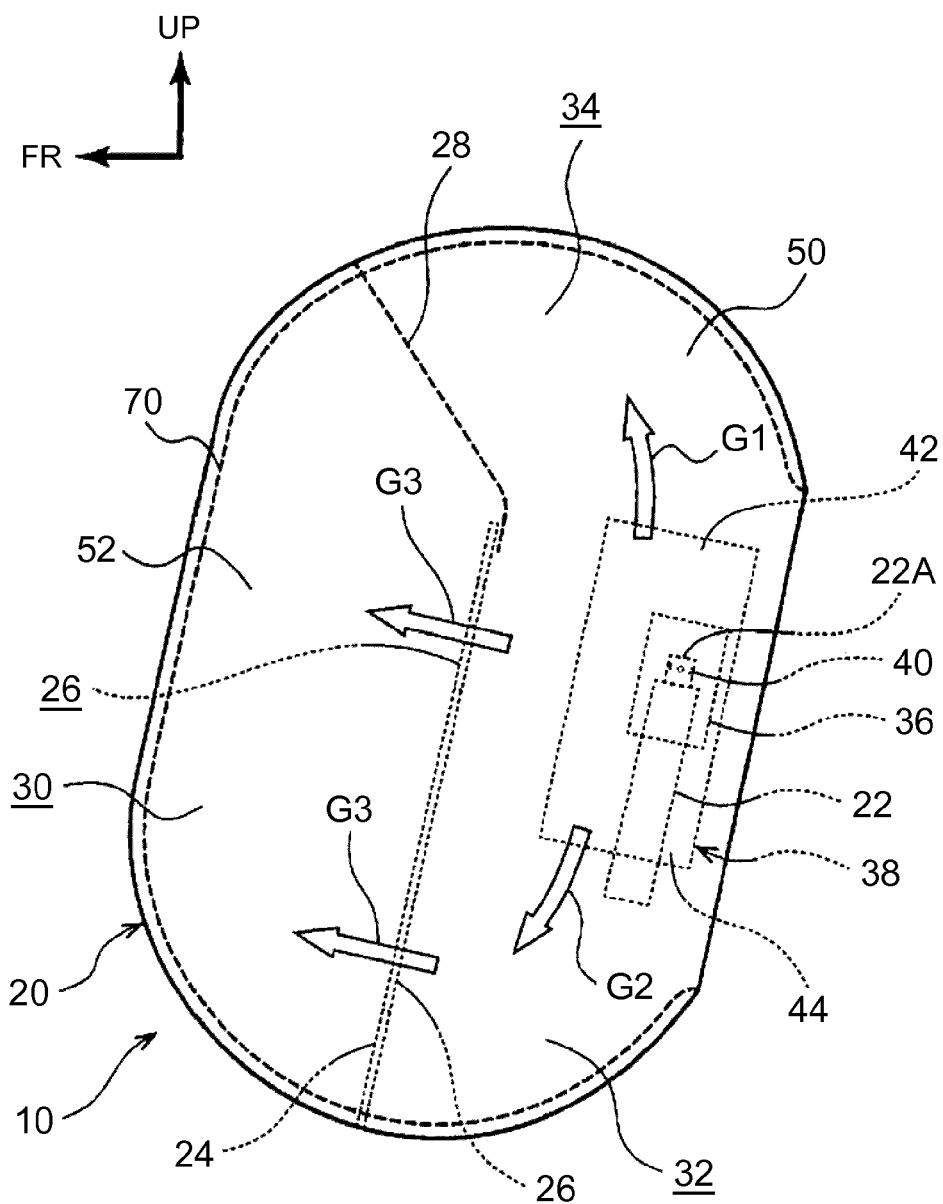
FIG. 2 is an enlarged side view illustrating, in an enlarged manner, the side air bag illustrated in FIG. 1.
Figure 3:
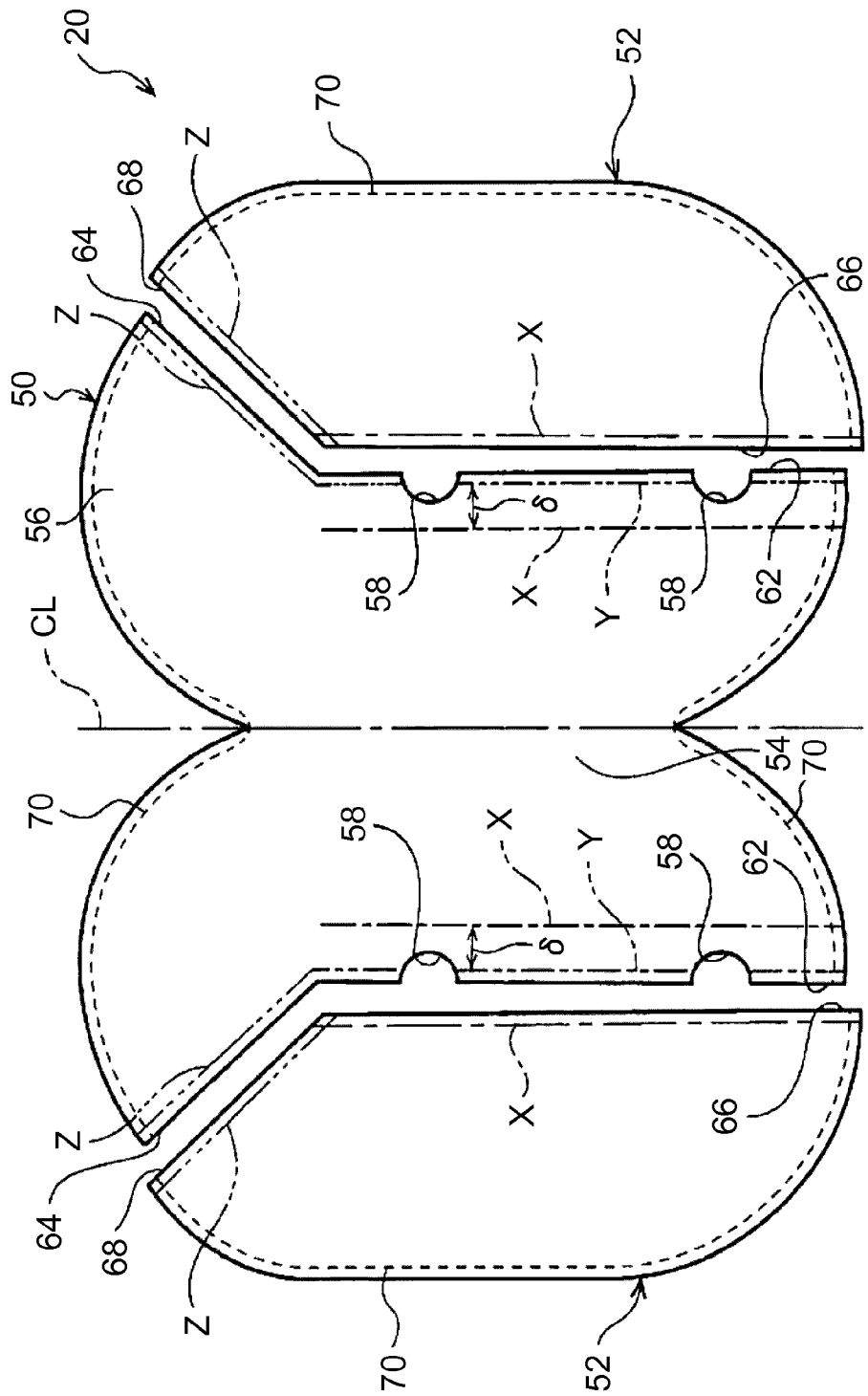
FIG. 3 is a plan view illustrating a panel configuration of the side air bag illustrated in FIG. 2 in a state where the side air bag is sewed.

The following describes a vehicle side air bag device 10 according to a first embodiment of the present invention with reference to FIGS. 1 to 3. Note that an arrow FR shown appropriately in each figure indicates a vehicle front side, an arrow UP indicates a vehicle upper side, and an arrow IN indicates an inner side in a vehicle width direction.

As illustrated in FIG. 1, the vehicle side air bag device 10 according to the first embodiment is provided in a door-side side portion 14A (a side portion on a side door side (not shown)) of a seatback 14 in a vehicle seat 12. The seatback 14 is connected to a rear end of a seat cushion 16 in a tilting manner, and a headrest 18 is connected to an upper end of the seatback 14.

Note that, in the present embodiment, a front-rear direction, a right-left direction (width direction), and an up-down direction of the vehicle seat 12 coincide with a front-rear direction, a right-left direction (width direction), and an up-down direction of a vehicle. Further, in FIG. 1, a world side impact dummy (World SID) P sits on the vehicle seat 12, instead of an actual occupant. A sitting posture of the world side impact dummy P is determined in the lateral impact test procedure (ECER95) currently adopted in Japan and Europe or the lateral impact test procedure (FMVSS214) adopted in the United States. Further, an inclination angle (a reclining angle) of the seatback 14 relative to the seat cushion 16 is set to a reference setting position corresponding to the sitting posture. On account of the description, the world side impact dummy P is hereinafter referred to as a "sitting occupant P."

The vehicle side air bag device 10 includes a side air bag 20 (described later), and an inflator (gas generator) 22 configured to generate gas in the side air bag 20, as main members. The side air bag 20 is folded and modulated with the inflator 22, etc., and is disposed (housed) in the door-side side portion 14A. Upon receipt of a pressure of gas generated from the inflator 22, the side air bag 20 is expanded and unfolded between the sitting occupant P and a door trim (a vehicle side portion) of a side door (see the state in FIG. 1). At the time when the side air bag 20 is expanded and unfolded, a seatback pad (not shown) disposed in the door-side side portion 14A is broken and a seat skin (not shown) is split by receiving an inflation pressure of the side air bag 20. Note that front, rear, upper, and lower directions of the side air bag 20 to be describe in the following description indicate directions in a state where the side air bag 20 is expanded and unfolded, unless otherwise specified, and generally coincide with front, rear, upper, and lower direction of the seatback 14.

As illustrated in FIGS. 1 and 2, the side air bag 20 is formed in a pouch-like shape, and in a side view, the side air bag 20 is formed generally in a rectangular shape of which a long-side direction is along a generally vehicle up-down direction. Further, a tether portion 24 placed with the generally vehicle up-down direction being taken as its longitudinal direction is provided by sewing in an intermediate part of the side air bag 20 in the front-rear direction. The tether portion 24 is placed linearly from a lower end of the side air bag 20 to a height that is about two thirds of the side air bag 20 in a height direction thereof. Further, the tether portion 24 is configured as a belt-shaped fabric material set to have a predetermined width-direction dimension. Furthermore, a plurality of (paired upper and lower) gas feed openings 26 is formed in an upper part and a lower part of the tether portion 24 in its longitudinal direction.

Further, a seam portion 28 extending linearly over a predetermined length is set in an upper part of the side air bag 20.

The seam portion 28 extends from an upper end of the tether portion 24 toward the vehicle front side and a vehicle diagonally upper side, and is inclined forward in a side view.

In the above configuration, the side air bag 20 includes: a front bag portion 30 placed on the vehicle front side relative to the tether portion 24 and the seam portion 28; a rear bag portion 32 placed on the vehicle rear side relative to the tether portion 24; and a forward extending portion 34 extended toward the vehicle front side from an upper end of the rear bag portion 32 so as to be placed on a vehicle upper side of the front bag portion 30. The front bag portion 30 communicates with the rear bag portion 32 via the gas feed opening 26, and is configured to restrain front parts of a chest C and an abdomen B of the sitting occupant P. Further, the inflator 22 is disposed inside the rear bag portion 32, and is configured to restrain rear parts of the chest C and the abdomen B of the sitting occupant P. Furthermore, the forward extending portion 34 communicates with the rear bag portion 32, and is configured to restrain a shoulder S of the sitting occupant P.

As mentioned earlier, the inflator 22, a diffuser 36, and a rectification cloth 38 are disposed inside the rear bag portion 32. The inflator 22 is a cylinder type having a generally circular column shape, and a gas ejection portion 22A is coaxially formed in one end (a vehicle upper side end) of the inflator 22 in a projecting manner. A plurality of gas ejection holes 40 is formed in the gas ejection portion 22A. When the inflator 22 is activated, a large amount of gas is generated from the gas ejection holes 40.

The metal and cylindrical diffuser 36 that is one size larger than the inflator 22 is placed around the gas ejection portion 22A of the inflator 22. Further, the inflator 22 and the diffuser 36 are inserted into the rectification cloth 38 formed in a cylindrical shape such that an upper end and a lower end thereof serve as a first rectification portion 42 and a second rectification portion 44. As an example, the diffuser 36 is fixed to the inflator 22 by caulking, and a stud bolt (not shown) projecting radially outwardly from an outer peripheral portion of the diffuser 36 penetrates through the rectification cloth 38 so as to be fastened and fixed to a nut of a side frame of a seatback frame (not shown).

Further, as illustrated in FIG. 1, a side collision ECU 46 provided in the vehicle is electrically connected to the inflator 22. A side collision sensor 48 for detecting a side collision is electrically connected to the side collision ECU 46. The side collision ECU 46 is configured to activate the inflator 22 at the time when the side collision ECU 46 detects a side collision (inevitability thereof) based on a signal from the side collision sensor 48. Note that, in a case where a pre-crash sensor that predicts (foresees) a side collision is electrically connected to the side collision ECU 46, the side collision ECU 46 may be configured to activate the inflator 22 at the time when the side collision ECU 46 predicts a side collision based on a signal from the pre-crash sensor.

As illustrated in FIG. 3, the side air bag 20 is constituted by one main panel 50 and two right and left subpanels 52 provided in pair. When the main panel 50 is connected to the paired right and left subpanels 52, such a shape is formed that two panels (base cloths) each having a track shape are placed adjacently so as to be integrated with each other.

More specifically, the main panel 50 is constituted by a rear bag portion forming portion 54 formed generally in a rectangular shape and having one short side that is cut generally in a mountain shape, and paired forward extending portion forming portions 56 projecting in a fan-like shape in respective directions distanced from each other from the other short side of the rear bag portion forming portion 54. The rear bag portion forming portion 54 is a portion to form the rear bag portion 32 (see FIG. 1) that restrains the rear parts of the chest C and the abdomen B of the sitting occupant P. Further, the forward extending portion forming portions 56 are portions to form the forward extending portion 34 that restrains the shoulder S of the sitting occupant P (see FIG. 1).

The main panel 50 is formed in a symmetric manner (line symmetry) to a center line CL. When the main panel 50 is folded in half along the center line CL, the forward extending portion forming portions 56 are extended (projected) in a direction in which the forward extending portion forming portions 56 diagonally intersect with the rear bag portion forming portion 54. Further, both side edges of the rear bag portion forming portion 54 extend in parallel to each other, and paired upper and lower semicircular notch portions 58 are formed on each the side edges. Hereinafter, each of the side edges of the rear bag portion forming portion 54 is referred to as a "main longitudinal edge portion 62" and that edge portion of each of the paired forward extending portion forming portions 56 which extends diagonally in a linear manner is called a "main lateral edge portion 64."

In the meantime, the subpanels 52 have a shape of which one end in its longitudinal direction has a quadrant shape and the other end in the longitudinal direction is cut diagonally. The subpanels 52 are portions to form the front bag portion 30 (see FIG. 1) that restrains the front parts of the chest C and the abdomen B of the sitting occupant P. Hereinafter, a side edge of the subpanel 52 on a main-panel placed side is referred to as a "secondary longitudinal edge portion 66" and that edge portion of the subpanel 52 which extends diagonally in a linear manner along the main lateral edge portion 64 of the forward extending portion forming portion 56 is referred to as a "secondary lateral edge portion 68."

(Operations and Effects)

The following describes operations and effects of the present embodiment.

The side air bag 20 is manufactured in the following manner. First, as illustrated in FIG. 3, in a panel connection step, the paired right and left subpanels 52 are connected to the main panel 50. More specifically, the secondary longitudinal edge portion 66 of the subpanel 52 is sewed at a position (a sewing line X) that is offset, only by a predetermined length δ, from the main longitudinal edge portion 62 toward the center line CL of the main panel 50 in the rear bag portion forming portion 54 of the main panel 50. Note that a reference sign "X," which is the same as the sewing line X of the main panel 50, is assigned to a sewing line (an alternate long and short dash line) along the secondary longitudinal edge portion 66.

Then, in a tether portion forming step, the main longitudinal edge portions 62 of the main panel 50 are sewed to each other along a sewing line Y (an alternate long and two short dashes line). Hereby, paired right and left notch portions 58 each having a semicircle shape are connected, so that the tether portion 24 having the paired upper and lower gas feed openings 26 is formed.

Subsequently, in a seam portion forming step, the paired main lateral edge portions 64 of the main panel 50 and the paired secondary lateral edge portions 68 of the paired right and left subpanels 52 are placed so as to overlap with each other in a quadruple manner, and then sewed to each other along a sewing line Z (an alternate long and two short dashes line). Finally, in an outer periphery sewing step, outer peripheral portions of the main panel 50 and outer peripheral portions of the subpanels 52 are sewed along a sewing portion 70. Hereby, as a panel assembly, the rear bag portion 32 is formed by the rear bag portion forming portion 54 and the tether portion 24, the forward extending portion 34 is formed by the forward extending portion forming portions 56, and further, the front bag portion 30 is formed by the tether portion 24 and the paired right and left subpanels 52.

In the vehicle side air bag device 10 thus configured, when the side collision ECU 46 detects a side collision based on a signal from the side collision sensor 48, the inflator 22 is activated by the side collision ECU 46. When the inflator 22 is activated, a large amount of gas is generated, and the gas thus generated is rectified by the diffuser 36 and the rectification cloth 38 into two direction, i.e., toward the vehicle upper side (a direction of an arrow G1 in FIG. 2) and toward the vehicle lower side (a direction of an arrow G2 in FIG. 2). Hereby, the rear bag portion 32 and the forward extending portion 34 of the side air bag 20 are expanded and unfolded first, so that the rear parts of the chest C, the abdomen B, and a lumbar L of the sitting occupant P and the shoulder S thereof are restrained. Further, the front bag portion 30 and the rear bag portion 32 communicate with each other via the gas feed openings 26 of the tether portion 24 that partitions them, so that the gas supplied to the rear bag portion 32 is partially supplied into the front bag portion 30 through the gas feed openings 26 (to a direction of an arrow G3 in FIG. 2). Hereby, the front bag portion 30 is expanded and unfolded following the rear bag portion 32, so that the front parts of the chest C, the abdomen B, and the lumbar L of the sitting occupant P are restrained.

Here, in the present embodiment, the forward extending portion 34 is extended toward the vehicle front side from the upper end of the rear bag portion 32 so as to be placed on the vehicle upper side of the front bag portion 30. Accordingly, even in a case where the vehicle has a side collision from the diagonally front side, the shoulder S is restrained quickly. Further, in the present embodiment, since the rear bag portion 32 and the front bag portion 30 are partitioned by the tether portion 24, it is possible to secure an energy absorption stroke at the time of a side collision, in comparison with a configuration in which they are partitioned by a seam portion. Further, in the present embodiment, since the forward extending portion 34 and the front bag portion 30 are partitioned by the seam portion 28, an upper arm A of the sitting occupant P is pushed up toward the vehicle upper side in response to an expanding and unfolding operation of the side air bag 20. That is, the upper arm A is pushed up toward the vehicle upper side along a large inclined surface or curved surface formed on an inner side of the upper end of the front bag portion 30.

Thus, according to the vehicle side air bag device 10 of the present embodiment, even in a case where the vehicle has a side collision from the diagonally front side, it is possible to quickly restrain the shoulder S of the sitting occupant P and to prevent the upper arm A from being placed between the chest C of the sitting occupant P and the side air bag 20, and further it is possible to successfully maintain energy absorption performance at the time of the side collision.

<Second Embodiment>

Figure 4:
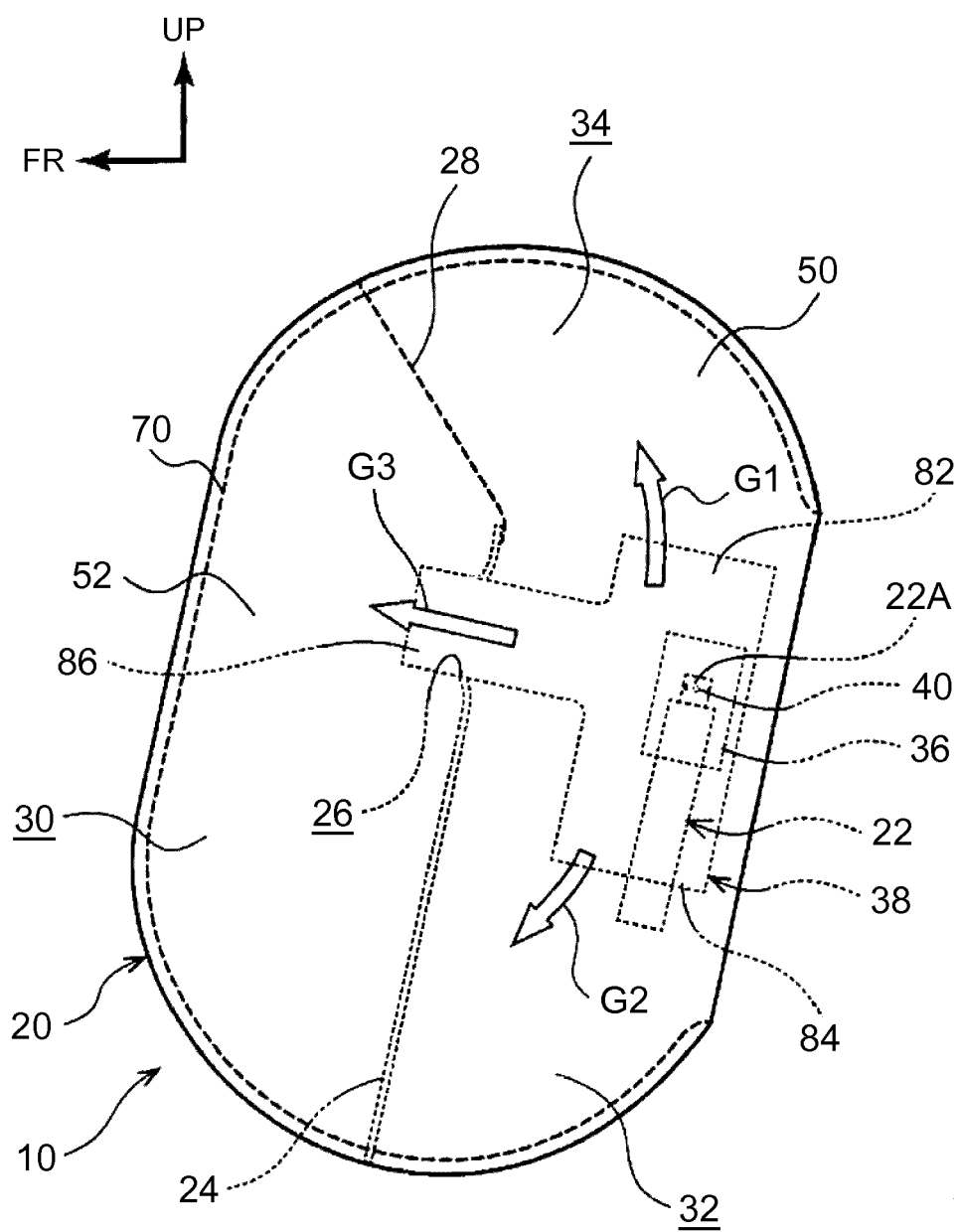
FIG. 4 is an enlarged side view corresponding to FIG. 2 and illustrating a side air bag of a vehicle side air bag device according to a second embodiment of the present invention.
Figure 5:
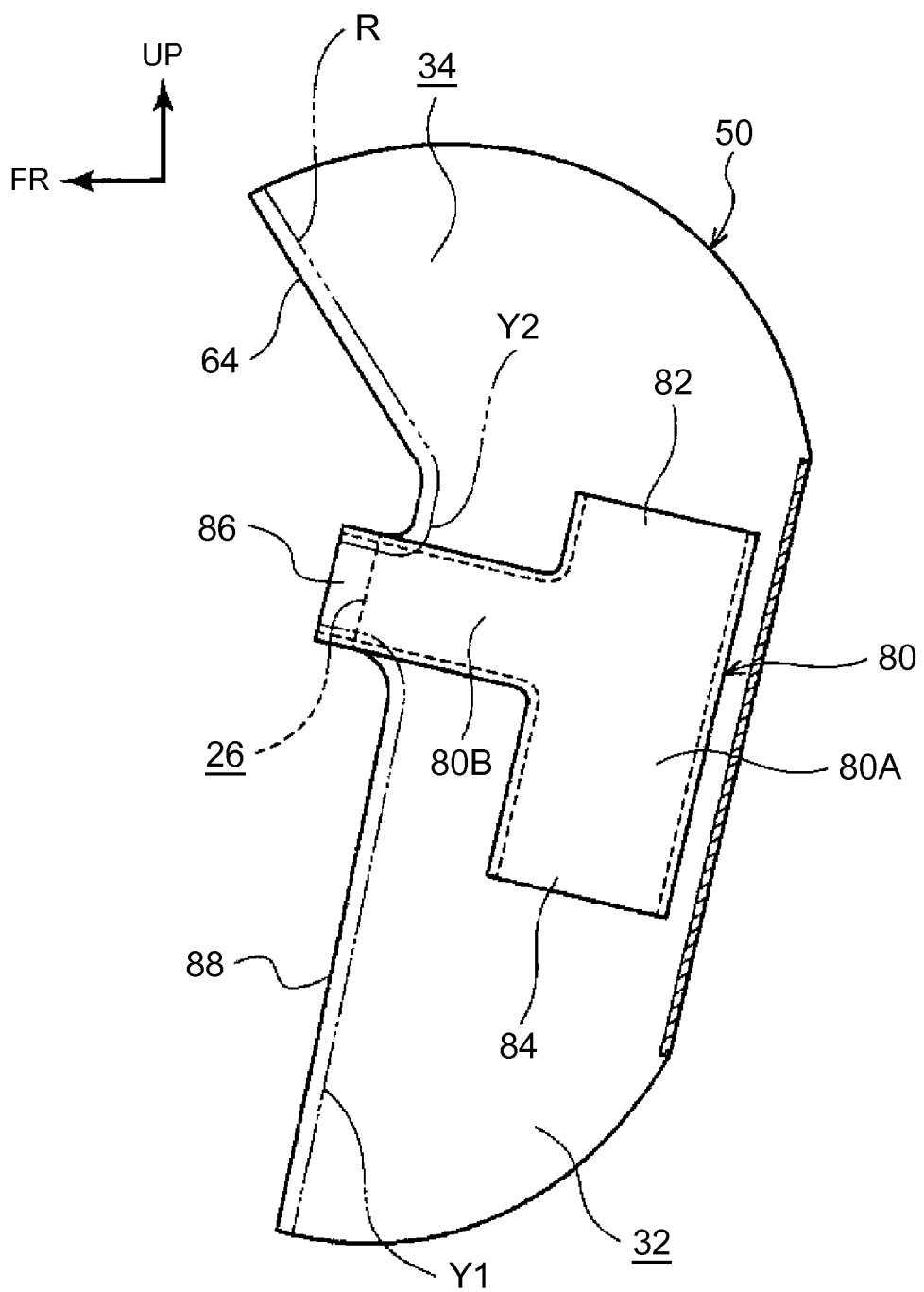
FIG. 5 is an enlarged side view illustrating a relationship with a rectification cloth by cutting a main panel illustrated in FIG. 4 in half.

The following describes a vehicle side air bag device 10 according to a second embodiment of the present invention with reference to FIGS. 4 and 5. Note that the same constituent as in the first embodiment has the same reference sign as in the first embodiment, and description thereof is omitted.

As illustrated in FIGS. 4 and 5, the second embodiment has a feature in that a rectification cloth 80 is formed in a T-shape to have a three-pronged structure. More specifically, the rectification cloth 80 is constituted by: a body portion 80A formed in a cylindrical shape such that an upper end and a lower end serve as a first rectification portion 82 and a second rectification portion 84; and a cylindrical branch portion 80B extended from a middle part of the body portion 80A in its axial direction toward a direction perpendicular to the axial direction. A tip end of the branch portion 80B serves as a third rectification portion 86, and is opened inside a front bag portion 30. The rectification cloth 80 is formed separately from a side air bag 20 in advance such that outer peripheral portions of two base cloths cut in a T-shape are sewed to each other.

Further, in a tether portion forming step, the rectification cloth 80 configured as such is attached to a main panel 50 in the following manner. That is, at the time when right and left main longitudinal edge portions 88 of the main panel 50 are sewed to each other, the tip end of the branch portion 80B is first inserted into a position where a gas feed opening 26 is disposed. Then, at the time when the right and left main longitudinal edge portions 88 of the main panel 50 are sewed to each other, a lower side sewing line Y1 below the branch portion 80B and an upper side sewing line Y2 above the branch portion 80B are sewed separately. At this time, an upper end of the lower side sewing line Y1 is extended toward the tip end of the branch portion 80B, and a lower end of the upper side sewing line Y2 is extended toward the tip end of the branch portion 80B.

(Operations/Effects)

According to the configuration, the rectification cloth 80 is disposed inside a rear bag portion 32. Accordingly, gas generated from an inflator 22 flows from the first rectification portion 82 toward the vehicle upper side (a direction of an arrow G1 in FIG. 4), flows from the second rectification portion 84 toward the vehicle lower side (a direction of an arrow G2 in FIG. 2), and further flows from the third rectification portion 86 toward the vehicle front side (a direction of an arrow G3 in FIG. 2). Since the third rectification portion 86 is inserted into the gas feed opening 26 of a tether portion 24, the gas passing through the third rectification portion 86 flows into the front bag portion 30. Since the rectification cloth 80 includes the first rectification portion 82, the second rectification portion 84, and the third rectification portion 86 as such, the front bag portion 30 can be expanded and unfolded at an early stage. As a result, according to the present embodiment, a pushup effect of an upper arm A of a sitting occupant P can be increased.

Further, in the present embodiment, the rectification cloth 80 including the first rectification portion 82, the second rectification portion 84, and the third rectification portion 86 is provided, and in the tether portion forming step, the tip end of the third rectification portion 86 of the rectification cloth 80 is inserted into the gas feed opening 26 of the tether portion 24. The tip end is sewed together with the main longitudinal edge portions 88 (a lower side main longitudinal edge portion 88A and an upper side main longitudinal edge portion 88B) of the main panel 50. As a result, according to the present embodiment, it is possible to easily manufacture the side air bag 20 including the rectification cloth 80 provided with the first rectification portion 82, the second rectification portion 84, and the third rectification portion 86.

<Supplementary Description of Embodiments>

In each of the above embodiments, the forward extending portion 34 and the front bag portion 30 are partitioned by the seam portion 28. However, each of the embodiments is not limited to this, and they may be partitioned by a narrow-width tether portion that is narrower than the tether portion 24.

Further, in the first embodiment, tether margins δ to form the tether portion 24 are provided equally on both right and left sides of the rear bag portion forming portion 54 of the main panel 50. However, each of the embodiments is not limited to this, and the tether margins may not be provided equally, and the tether portion may be provided on either one side of right and left side edges of the rear bag portion forming portion 54 to sew the main longitudinal edge portions to each other. Further, in the first embodiment, no cut is formed vertically toward the center line CL in the upper ends of the main longitudinal edge portions 62 on forming the tether portion 24. This is to avoid formation of a part on which a stress is concentrated by providing a cut. If a reinforcement such as a patch is provided to prevent a problem with stress concentration, a cut may be provided from the upper end of the main longitudinal edge portion.

Further, in each of the above embodiments, the side air bag 20 is manufactured by sewing the base cloths. However, each of the embodiments is not limited to this, and the side air bag 20 may be double-woven integrally by a one-piece-woven method, which is also referred to as OPW. A side air bag formed by the OPW method is a seamless bag formed such that two cloths are woven simultaneously by use of a Jacquard loom, and a necessary part is woven in a connected manner to form a pouch-like shape.

Further, in each of the above embodiments, the shoulder S, the chest C, the abdomen B, and the lumbar L of the sitting occupant P are restrained by the side air bag 20. However, each of the embodiments is not limited to this, and the side air bag is configured to be able to restrain at least the shoulder, the chest, and the abdomen of the sitting occupant.

Further, in each of the above embodiments, the main panel 50 is folded in half along the center line CL. However, each of the embodiments is not limited to this, and a main panel may be divided into two pieces in advance.

The invention claimed is:

1. A vehicle side air bag device comprising:
an inflator provided in a vehicle seat and configured to be activated to generate gas when a side collision of a vehicle is detected or predicted;
a side air bag provided in a side portion on an outer side, in a vehicle width direction, of a seatback of the vehicle seat, the side air bag being configured to be expanded and unfolded between a sitting occupant and a vehicle-body side portion when the gas generated from the inflator is supplied thereinside, the side air bag including a front bag portion configured to restrain front parts of a chest and an abdomen of the sitting occupant, a rear bag portion including the inflator thereinside and configured to restrain rear parts of the chest and the abdominal, and a forward extending portion extended toward a vehicle front side from an upper end of the rear bag portion so as to be placed on a vehicle upper side of the front bag portion, the forward extending portion being configured to restrain a shoulder of the sitting occupant;
a tether portion placed in a boundary portion between the front bag portion and the rear bag portion in the side air bag so as to partition the front bag portion from the rear bag portion, the tether portion having a gas feed opening via which the front bag portion and the rear bag portion communicate with each other; and
a seam portion or a narrow-width tether portion narrower than the tether portion, the seam portion or the narrow-width tether portion being set in a boundary portion between the forward extending portion and the front bag portion in the side air bag so as to partition the forward extending portion from the front bag portion, wherein the entire seam portion or the entire narrow-width tether portion is narrower than the tether portion.

2. The vehicle side air bag device according to claim 1, wherein:
the side air bag is configured to include:
a main panel made of one or two panels and forming the rear bag portion, the forward extending portion, and the tether portion; and
paired right and left subpanels sewed to the main panel with tether margins to form the tether portion, the paired right and left subpanels forming the front bag portion.

3. The vehicle side air bag device according to claim 1, wherein:
a rectification cloth is disposed inside the rear bag portion, the rectification cloth including a first rectification portion, a second rectification portion, and a third rectification portion configured to flow the gas ejected from the inflator to three directions of a vehicle upper side, a vehicle lower side, and a vehicle front side; and
the third rectification portion is inserted into the gas feed opening of the tether portion.

4. A side air bag manufacturing method comprising:
sewing secondary longitudinal edge portions of paired right and left subpanels to a main panel at a position offset from main longitudinal edge portions of the main panel toward a center line of the main panel,
the main panel including a rear bag portion forming portion to form a rear bag portion configured to restrain rear parts of a chest and an abdomen of a sitting occupant, and forward extending portion forming portions to form a forward extending portion configured to restrain a shoulder of the sitting occupant, the forward extending portion forming portions being extended from an end, in a longitudinal direction, of the rear bag portion forming portion in directions intersecting with the rear bag portion forming portion,
the main panel having a symmetrical shape in a right-and left direction,
the main panel including paired right and left main longitudinal edge portions on both side edges of the rear bag portion forming portion, and paired right and left main lateral edge portions on respective lower edges of the forward extending portion forming portions,
the paired right and left subpanels each having the secondary longitudinal edge portion on one side edge and a secondary lateral edge portion on an upper edge intersecting with the one side edge, the paired right and left subpanels being configured to form a front bag portion configured to restrain front parts of the chest and the abdomen of the sitting occupant;
forming a tether portion having a gas feed opening, by sewing the main longitudinal edge portions of the main panel to each other;
sewing the paired main lateral edge portions of the main panel and the paired secondary lateral edge portions of the paired right and left subpanels in an overlapping manner; and
sewing outer peripheral portions of the main panel and outer peripheral portions of the subpanels.

5. The side air bag manufacturing method according to claim 4, wherein:
a rectification cloth is placed on a rear-bag-portion-forming-portion side of the main panel, and includes a first rectification portion and a second rectification portion configured to flow gas toward both ends, in a longitudinal direction, of the rear bag portion forming portion, and a third rectification portion extended in a direction intersecting with the first rectification portion and the second rectification portion and configured to flow the gas in its extending direction, and in forming the tether portion, a tip end of the third rectification portion is inserted into the gas feed opening so that the tip end is sewed together with the main longitudinal edge portions of the main panel.

6. The side air bag manufacturing method according to claim 4, wherein:

semicircular notch portions are formed in the paired right and left main longitudinal edge portions, and when the paired right and left main longitudinal edge portions are sewed to each other in forming the tether portion, a round-shaped gas feed opening is formed.

7. The side air bag manufacturing method according to claim 5, wherein:

the rectification cloth is formed in advance separately from the side air bag by sewing outer peripheral portions of two base cloths cut in a T-shape, and in forming the tether portion, the tip end of the third rectification portion is inserted into the gas feed opening so that the tip end is sewed together with the main longitudinal edge portions of the main panel.

8. The side air bag manufacturing method according to claim 5, wherein:

in forming the tether portion, at the time when the main longitudinal edge portions of the main panel are sewed to each other, a lower side sewing line below the third rectification portion and an upper side sewing line above the third rectification portion are sewed separately, and an upper end of the lower side sewing line is extended toward the tip end of the third rectification portion, and a lower end of the upper side sewing line is extended toward the tip end of the third rectification portion.

* * * * *